United States Patent [19]

Iwasaki

[11] Patent Number: 5,162,630

[45] Date of Patent: Nov. 10, 1992

[54] WIRE ELECTRODE THREADING APPARATUS FOR A WIRECUT ELECTRIC DISCHARGE MACHINE

[75] Inventor: Takeshi Iwasaki, Aichi, Japan

[73] Assignee: Mitsubishi Denki K.K., Tokyo, Japan

[21] Appl. No.: 625,385

[22] Filed: Dec. 11, 1990

[30] Foreign Application Priority Data

Feb. 27, 1990 [JP] Japan .................. 2-46541

[51] Int. Cl.$^5$ .............................................. B23H 7/10
[52] U.S. Cl. ............................ 219/69.12; 219/69.14; 226/97
[58] Field of Search ............... 219/69.12, 69.14, 69.17; 226/91, 97

[56] References Cited

U.S. PATENT DOCUMENTS

| | | | |
|---|---|---|---|
| 4,495,393 | 1/1985 | Janicke | 219/69.12 |
| 4,652,716 | 3/1987 | Schneider et al. | 219/69.12 |
| 4,704,511 | 11/1987 | Miyano | 219/69.12 |

FOREIGN PATENT DOCUMENTS

| | | | |
|---|---|---|---|
| 0111001 | 6/1984 | European Pat. Off. | |
| 207726 | 10/1985 | Japan | 219/69.12 |
| 152326 | 7/1986 | Japan | 219/69.14 |
| 62-94225 | 4/1987 | Japan | 219/69.17 |
| 271630 | 11/1987 | Japan | 219/69.12 |
| 63-50131 | 10/1988 | Japan | |
| 2-100824 | 4/1990 | Japan | 219/69.12 |
| 2-100828 | 4/1990 | Japan | 219/69.17 |
| WO8701636 | 3/1987 | PCT Int'l Appl. | |

Primary Examiner—Geoffrey S. Evans
Attorney, Agent, or Firm—Sughrue, Mion, Zinn, Macpeak & Seas

[57] ABSTRACT

A wire threading apparatus of the jet fluid stream transfer type is improved by providing the ability to reconfigure the structure of the apparatus during threading so that the entire apparatus is clear of the splash pattern of the fluid as it rebounds from the receiving guide.

17 Claims, 4 Drawing Sheets

WIRE ELECTRODE THREADING APPARATUS FOR A WIRECUT ELECTRIC DISCHARGE MACHINE

BACKGROUND OF THE INVENTION

1. Field of the Invention

The present invention relates to a wirecut electric discharge machine (hereinafter referred to as a "wirecut EDM") and particularly to an apparatus for threading a wire electrode through a wire guide.

2. Description of the Background Art

FIG. 6 shows a conventional wire electrode supplying apparatus for a wirecut EDM, of the type disclosed in Japanese Patent Disclosure Bulletin No. 1981-10130 or U.S. Pat. No. 4,495,393. It illustrates an apparatus for transferring a wire electrode 3, as confined by a jet fluid stream, e.g. jet water stream 7, from a wire electrode supplying wire guide body 4 to a wire electrode receiving wire guide body 5, the two bodies being disposed across a workpiece 1. Referring to FIG. 6, the workpiece 1 has an EDMing starting hole 2 drilled therein. Prior to the initiation of an EDM operation on the workpiece 1, the wire electrode 3 must be threaded from the wire electrode supplying wire guide body 4, through the hole 2, to the wire electrode receiving wire guide body 5. To this end, a jet nozzle 6 is formed within the wire guide body 4 and provides a jet fluid stream 7 along a line connecting a die guide 18 in guide body 4 and a die guide 9 in guide body 5. Similarly aligned are dielectric nozzles 10 and 11, located in wire guide bodies and 5, respectively. The dielectric is supplied from a dielectric supplying unit (not illustrated).

In such a structure the wire electrode 3 may be automatically threaded. To this end, the jet fluid stream is injected from the jet nozzle 6 provided in the wire electrode supplying wire guide body 4, and the wire electrode 3 is moved, confined by the jet fluid stream 7, by a wire electrode supplying mechanism (not illustrated) through the dielectric nozzle 10, the EDMing starting hole and the wire electrode receiving wire guide body 5, in this order. Then, it is wound on a wire collecting drum (not shown) or directed to a predetermined container. Wirecut EDMing is enabled upon the completion of such threading.

However, if the clearance between the lower dielectric nozzle 11 and the workpiece 1 is small and the diameter of the EDMing starting hole 2 is smaller than the outside diameter of the dielectric nozzle 11, as shown in FIG. 7, the jet fluid stream 7 strikes against and rebounds from the die guide 9. The rebounding fluid will fill the dielectric nozzle 11 as well as the EDMing starting hole 2. Since the jet fluid stream 7 is abruptly reduced in flow rate due to interference caused by the fluid in the filled nozzle and hole, and also encounters turbulence, it loses the power to confine the wire electrode 3. In addition, the wire electrode 3 is always curled to some degree because it ordinarily is wound around a supply bobbin for storage, and initially receives curl when produced in the wire drawing process. Further, since a pulley, a roller and the like are generally used in the path of the wire electrode 3 from the wire supply bobbin to the wire electrode supplying wire guide body in the wirecut EDM, a new curl may be added to the leading end of wire electrode 3 while it is running along the wire electrode path. Since the wire electrode 3 is curled due to composite factors as described above, the curling ratio, the curling direction, etc. of the wire electrode 3 will vary when the wire electrode 3 is uncoiled from the wire supply bobbin and is directed along the wire electrode path. Hence, when the jet fluid stream loses its ability to confine the wire electrode 3, it becomes difficult for the tip of the wire electrode 3 to be accurately fed into the die guide 9. As a result, the wire electrode 3 may be diverted away from the die guide 9 as illustrated in FIG. 7.

If a workpiece is not present between the dielectric nozzles 10 and 11, as shown in FIG. 8, the jet fluid stream 7 loses its power to confine the wire electrode 3 and the electrode may be diverted away from the die guide 9 or the dielectric nozzle 11, as described previously. As a result, the wire electrode supplying operation cannot be continued because the jet fluid stream 7 fills the dielectric nozzle 11 and the fluid rebounding from the dielectric nozzle 11 will interfere with the jet fluid stream 7.

One conventional solution to this problem is the use of a drain 22 in the dielectric nozzle 11, as seen in FIG. 9 and taught in Japanese Patent Bulletin 63-50131. During the threading operation, the fluid jet stream will guide the tip of wire electrode 3 through the hole 2 in the workpiece 1 and into the dielectric nozzle 11. The jet stream fluid is drained from the nozzle 11 by drain 22, thereby preventing the nozzle from being filled. However, the jet stream still causes turbulence when it encounters the die guide 9, which interferes with the accurate guiding of the tip of wire 3.

SUMMARY OF THE INVENTION

It is, accordingly, an object of the preset invention to overcome the disadvantages in the prior art by providing a wirecut EDM including a highly reliable wire electrode threading apparatus, which allows the tip of a wire electrode to be accurately led into a die guide.

It is a further object of the present invention to avoid interference with a fluid jet stream used to facilitate the threading of a wire electrode into a die guide.

It is yet another object of the present invention to permit automatic threading of a wire electrode using a jet fluid stream directed into an EDMing starting hole and a dielectric nozzle toward a die guide, without filling the dielectric nozzle and the EDMing starting hole with accumulated fluid from the jet fluid stream and without interfering with the jet fluid stream.

A wirecut EDM of a first embodiment of the present invention transfers a wire electrode, as confined by a jet fluid stream, from a wire electrode supplying wire guide body to a wire electrode receiving wire guide body having a dielectric nozzle, and comprises a structure for deflecting the jet fluid stream that is injected toward the wire electrode receiving wire guide body. The deflecting structure directs the deflected fluid in a direction toward the outside of the dielectric nozzle, such that the deflected fluid does not interfere with the jet fluid stream.

A wirecut EDM of a second embodiment of the present invention transfers a wire electrode, as confined by a jet fluid stream, from a wire electrode supplying wire guide body to a wire electrode receiving wire guide body, and comprises a structure for varying the clearance between a dielectric nozzle, forming a part of the wire electrode receiving wire guide body, and a workpiece.

A wirecut EDM according to a third embodiment of the present invention transfers a wire electrode, as confined by a jet fluid stream, from a wire electrode supplying wire guide body to a wire electrode receiving wire guide body, and comprises a structure for moving a dielectric nozzle, forming a part of the wire electrode receiving wire guide body, in relation to a workpiece.

A wirecut EDM of a fourth embodiment of the present invention transfers a wire electrode, as confined by a jet fluid stream, from a wire electrode supplying wire guide body to a wire electrode receiving wire guide body, the guide body comprising a dielectric nozzle and a guide block having threaded engagement therebetween, the nozzle being rotated relative to the guide block by a mechanical device, thereby changing its location and clearance with respect to the workpiece.

The wirecut EDM according to the present invention allows the jet fluid stream to reach the die guide accurately and thereby permit the wire electrode to be accurately led to the die guide. In this regard, the present invention permits the jet fluid stream to be reflected from the die guide without interference from the nozzle, without filling the dielectric nozzle and without filling the EDM starting hole with fluid from the jet fluid stream.

DESCRIPTION OF THE PREFERRED EMBODIMENTS

Figure 1:
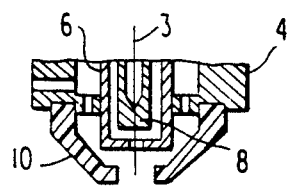
FIG. 1 is a configuration diagram of a wire electrode supplying apparatus of a wirecut EDM according to one embodiment of the present invention.
Figure 1:
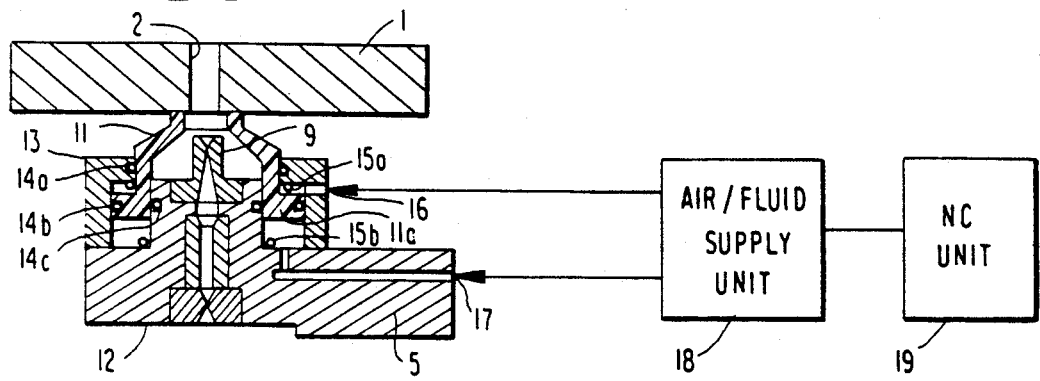
Figure 6:
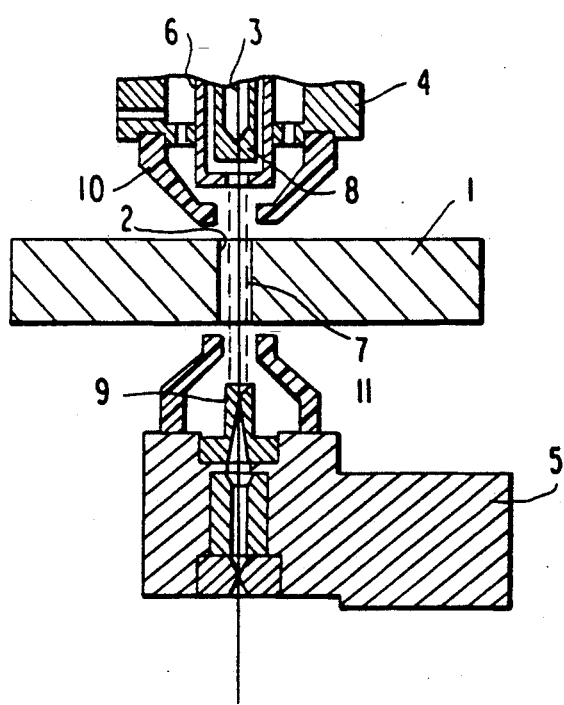
FIG. 6 is a configuration diagram of a conventional wire electrode supplying apparatus.
Figure 7:
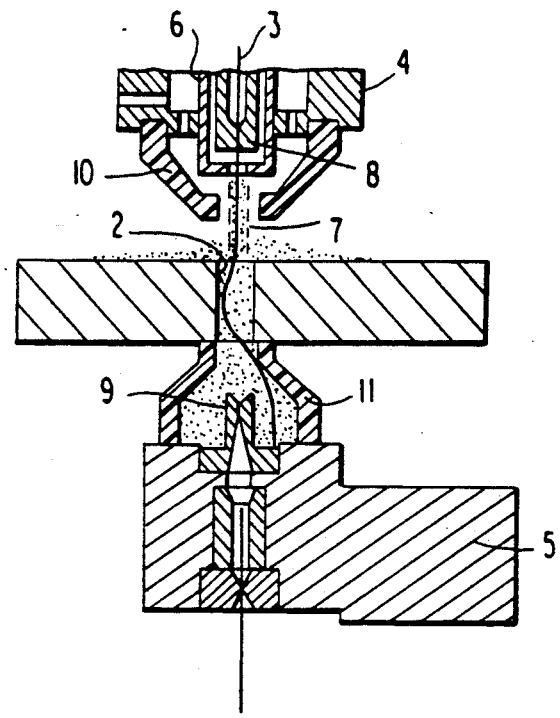
FIGS. 7 and 8 illustrate disadvantages of the conventional apparatus.
Figure 8:
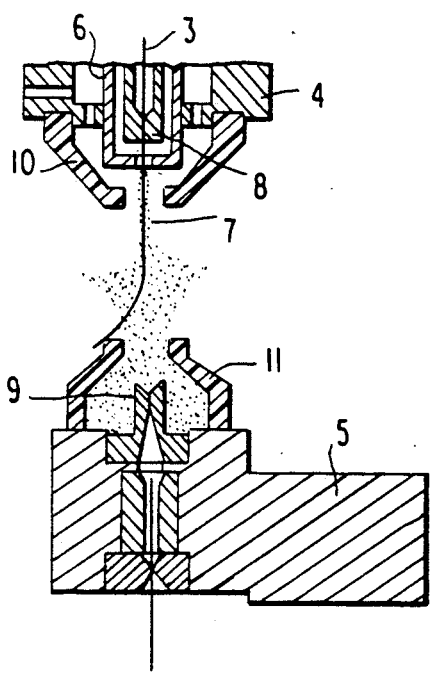
Figure 9:
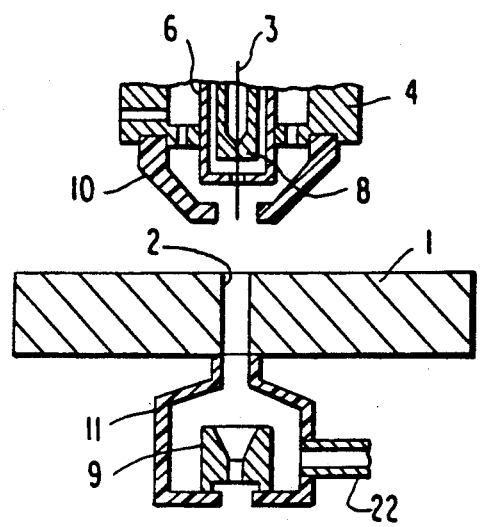
FIG. 9 illustrates yet a further configuration of a conventional wire electrode supplying apparatus.

A first embodiment of the present invention will now be described in reference to the drawings. In FIG. 1 and FIG. 6, identical numerals identify identical or corresponding parts. In FIG. 1, a wire electrode receiving dielectric nozzle 11, having a flange 11a, is slidably installed on a guide block 12. A nozzle retainer 13 confines the nozzle 11. O-rings 14a, 14b and 14c are used to seal the interface between nozzle 11 and the surface of block 12 and retainer 13. Upper and lower clearance spaces are formed above and below the surfaces of the flange 11a of the dielectric nozzle 11 at the surfaces of the nozzle retainer 13 and the guide block 12. The clearance spaces are linked to fluid inlet paths, e.g. air inlet paths 16 and 17, respectively. Stopper rings 15a and 15b locate the top dead center and a bottom dead center of the dielectric nozzle 11. An air supply unit 18 is controlled by a NC unit 19 and supplies air through the air inlet paths 16 and 17.

Figure 2:
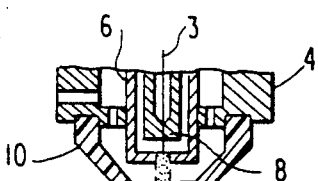
FIG. 2 illustrates operation of the embodiment of the present invention shown in FIG. 1.
Figure 2:
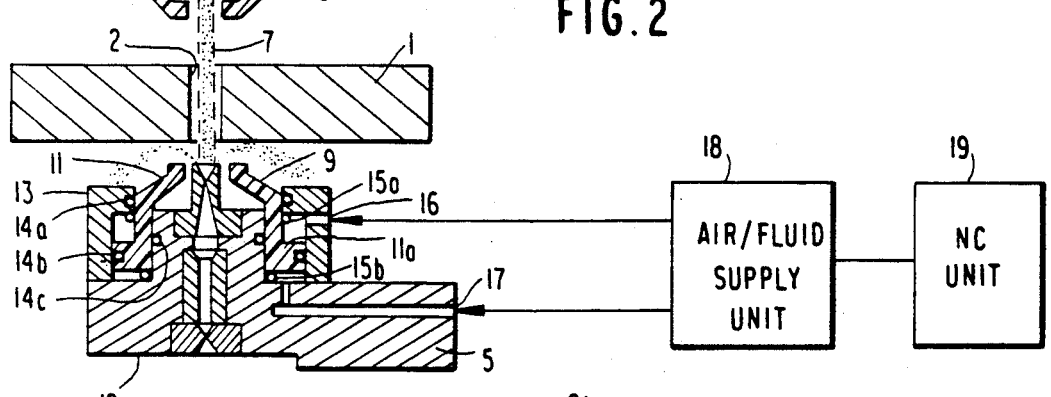

FIG. 2 illustrates the operation of the apparatus according to the first embodiment in threading the wire electrode 3. When the wire electrode 3 threading operation is initiated, a wire electrode supply (not illustrated) is driven, and at the same time, a jet fluid stream 7, e.g. a jet water stream, is injected by the jet nozzle 6. The wire electrode 3 is confined in the jet fluid stream 7 and is fed toward the wire electrode receiving guide body 5. In preparation for the guide operation, the NC unit 19 will send a signal to the air supply unit 18 to provide air to the upper clearance above the surface of flange 11a of the dielectric nozzle 11, and relieve air from the lower clearance, through the air inlet paths 16, 17, respectively. When a predetermined static pressure is reached in the upper clearance, the dielectric nozzle 11 is forced to the bottom dead center, as defined by the stopper ring 15b.

Figure 3:
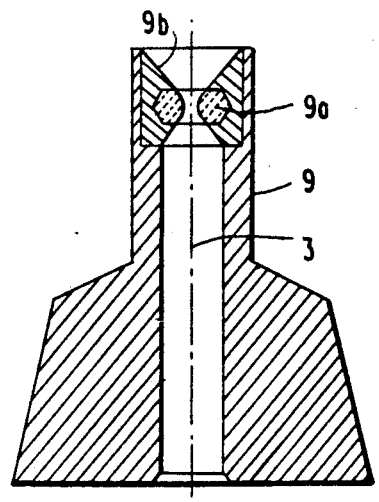
FIG. 3 is a detailed sectional view of a wire guide employed in the device in FIG. 1.

Referring now to an expanded sectional view of the die guide 9 shown in FIG. 3, a diamond die 9a is usually 5 to 10 μm larger in diameter than the wire electrode 3, i.e. a maximum of 0.31 mm, because the wire electrode 3 used is generally 0.1 mm to 0.3 mm in diameter. Since the diameter of the jet fluid stream 7 is usually 1 mm to 1.5 mm, the diameter of the diamond die 9a is much smaller than that of the jet fluid stream 7. The tip of the die guide 9 ahead of the diamond die 9a has a conical guide surface 9b which opens in the direction that the jet fluid stream 7 is injected. Hence, after the jet fluid stream 7 strikes the die guide 9, the major volume thereof is reflected upward in a direction determined by the geometry of the conical guide surface 9b. Since the dielectric nozzle 11 is in a lower position at this time, the reflected stream is directed to the outside of the wire electrode receiving wire guide 5 without interfering with the dielectric nozzle 11, as seen in FIG. 2. The reflected stream strikes against the bottom surface of the workpiece 1 and further splashes downward as a secondary reflected stream. However, since the secondary stream is diverted away from the wire electrode receiving guide body 5 as illustrated, the dielectric nozzle 11 is not filled with the fluid 7 and the rebounding stream does not interference with the jet fluid stream 7. Hence, the wire electrode 3 can be confined by the jet fluid stream 7 and accurately supplied to the wire guide 9. On completion of the wire electrode threading operation, the NC unit 19 provides a signal to the air supply unit 18, which then supplies air to the lower clearance under the surface of flange 11a of the dielectric nozzle 11 through the air inlet path 17, and relieves the inlet 16. This causes the dielectric nozzle 11 to rise to the top dead center as defined by the stopper ring 15a. Thereafter, wirecut EDMing is enabled.

Figure 4:
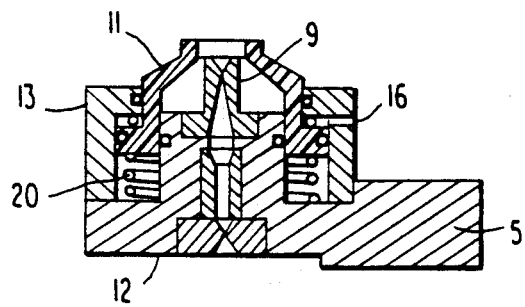
FIGS. 4 and 5a, 5b, 5c and 5d are configuration diagrams of two other embodiments of the present invention.

FIG. 4 illustrates a second embodiment of the present invention. As shown in FIG. 4, a compression spring 20 is disposed under the flange surface as a driver for the dielectric nozzle 11. The dielectric nozzle 11 is usually located at the top dead center by operation of the compression spring 20, for EDMing. However, for the wire electrode threading operation, air is supplied from the air inlet path 16 and the nozzle 11 is lowered to the bottom dead center. It will be appreciated that, in the second embodiment in particular but also in the first embodiment, hydraulic pressure, other fluid pressure, electromagnetic force and the like may be employed as the driving media.

Figure 5A:
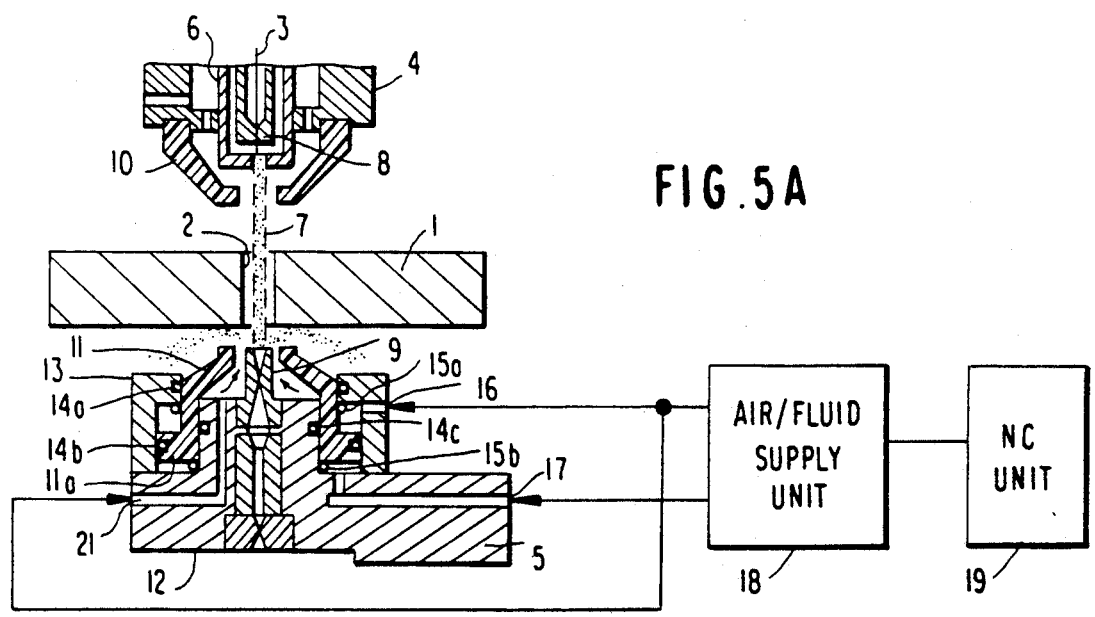

FIG. 5A illustrates a third embodiment of the present invention. The structure is substantially the same as that of the embodiment of FIG. 1, and common reference numbers therein refer to common structures. However, this embodiment further includes an air inlet path 21 leading to the inside of the dielectric nozzle 11 within the guide block 12. This air inlet path is operative to prevent part of the jet fluid stream 7 from flowing into the dielectric nozzle 11 by enabling the injection of air into the nozzle. With this additional force opposing the entry of fluid, the reliability of the threading operation can be further improved.

Figure 5B:
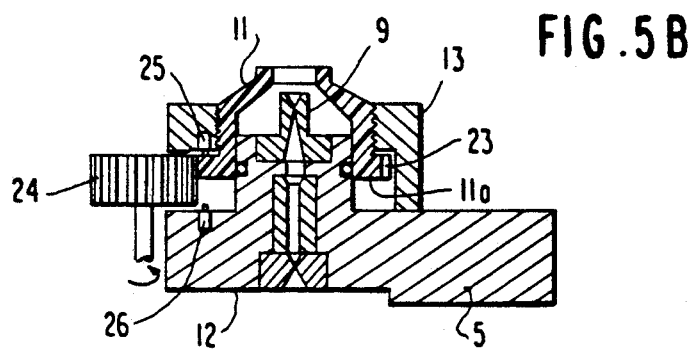

FIG. 5B illustrates a fourth embodiment of the present invention wherein threads are provided on the inner periphery of the dielectric nozzle 11 and engaged with threads on the guide block 12. The dielectric nozzle 11 may be rotated by a mechanical drive to change the relative position (height) of the dielectric nozzle 11 with respect to the wire electrode receiving wire guide body 5. For example, a spur gear 23 may be provided on the outer periphery of the flange 11a of the dielectric nozzle 11 and a pinion 24 may be provided for collection to the output shaft of a motor (not shown) provided in or adjacent the guide block 12. With this structure the dielectric nozzle 11 is driven by the motor to change the relative positions of the dielectric nozzle 11 and the wire electrode receiving wire guide body 5. In this embodiment, the top and bottom dead centers of the dielectric nozzle 11 may be detected by limit switches 25, 26, respectively. Alternatively, a pulse motor may be used to control the dielectric nozzle using a given number of pulses, or a sensor, e.g. an optical sensor, may be employed.

Figure 5C:
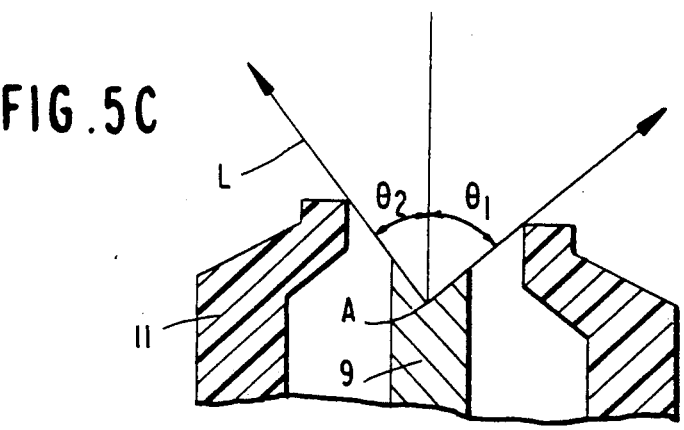

In the above described embodiments the nozzle 11 and the wire electrode receiving wire guide body 5 are relatively moved, thereby changing the "effective aperture" of the dielectric nozzle. As seen in FIG. 5C, the effective aperture may be defined by a cone, whose apex (A) is coincident with the center of die guide 9 and whose surface is defined by a line (L) disposed at an apex angle $\theta$ from the vertical. When the nozzle 11 is moved downwardly, the effective aperture is relatively large, as represented by a large apex angle $\theta_1$. When the nozzle 11 is moved upwardly (in the left half of FIG. 5C), the effective aperture is smaller and is defined by an apex angle $\theta_2$, where $\theta_2 < \theta_1$. Thus, the effective aperture is changed by movement of the nozzle.

Figure 5D:
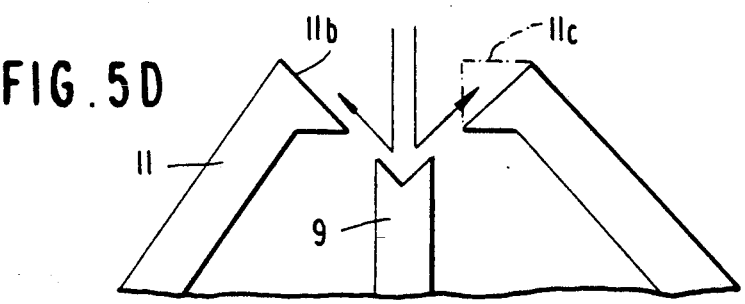

A further modification to the nozzle, as seen in FIG. 5D, will angle the nozzle surface 11b in a direction parallel to the direction of the fluid rebounding from the die guide 9, along the surface of the cone in FIG. 5C. This design reduces the turbulence caused by the rebounding fluid striking the edge 11C of the conventionally shaped nozzle, illustrated by dotted lines in FIG. 5D.

It should be appreciated that the dielectric nozzle 11 and wire electrode receiving wire guide body 5 may be integrally moved up and down and thus maintained in a predetermined positional relationship.

It will be apparent that the invention, as described above, achieves a wirecut EDM which allows the jet fluid stream to reach the die guide accurately and the wire electrode to be accurately threaded into the die guide without filling the dielectric nozzle an the EDMing starting hole with fluid, thereby ensuring a highly reliable wire electrode supplying operation.

I claim:

1. An apparatus for transferring a wire from a wire supply to a wire receiving guide body, said wire supply and said wire receiving guide body being joined by a jet fluid stream, said wire receiving guide body including a surrounding member, comprising: means for rebounding the jet fluid stream injected toward said wire receiving guide body, said means being operative to create a rebound fluid stream directed to a position outside said surrounding member and in a direction not interfering with said jet stream.

2. An apparatus as claimed in claim 1, wherein said wire comprises an electrode for a wire-cut EDM, and said surrounding member comprises a dielectric nozzle for said EDM.

3. An EDM apparatus for transferring a wire electrode confined by a jet fluid steam from a wire electrode supplying wire guide body to a wire electrode receiving wire guide body, including a wire-receiving lower dielectric nozzle which defines a clearance with a lower surface of a workpiece, and moving means for changing said clearance between the dielectric nozzle and the workpiece during transfer to said wire electrode.

4. An apparatus as claimed in claim 3, wherein said moving means comprises fluid actuated means for translating said nozzle.

5. An apparatus as claimed in claim 3, wherein said moving means comprises a mechanical drive.

6. An apparatus as claimed in claim 3, wherein said moving means comprises fluid actuated means for translating said nozzle in a first direction, and spring means for biasing said nozzle in a second, opposite direction.

7. An EDM apparatus for transferring a wire electrode confined by a jet fluid stream from a wire electrode supplying wire guide body to a wire electrode receiving wire guide body located generally within a dielectric nozzle, comprising: moving means for moving the dielectric nozzle along the direction of said jet fluid stream and in variable relation to the wire electrode receiving wire guide body.

8. An apparatus as claimed in claim 7, wherein said moving means comprises fluid actuated means for translating said nozzle.

9. An apparatus as claimed in claim 7, wherein said moving means comprises a mechanical drive.

10. An apparatus as claimed in claim 7, wherein said moving means comprises fluid actuated means for translating said nozzle in a first direction, and spring means for biasing said nozzle in a second, opposite direction.

11. An EDM apparatus for transferring a wire confined by a jet fluid stream from a wire supply to a wire guide, comprising means for causing the jet fluid steam to be injected toward wire receiving guide means housing said wire guide and means for causing said fluid stream to splash to the outside of said wire receiving guide means after striking said wire guide.

12. An apparatus as claimed in claim 11, wherein said means for causing said fluid stream to splash to the outside of said wire receiving guide means comprises a conical splash surface on said wire guide means, and means for ensuring that all portions of said wire receiving guide means fail to intersect a projection of said conical splash surface, at least at the time of wire transfer.

13. An apparatus as claimed in claim 12, wherein said means for ensuring comprises means for controlling the relative position of said wire guide means and at least one other portion of said wire receiving guide means.

14. An apparatus as claimed in claim 13, wherein said at least one other portion includes a nozzle structure movable between a first position intersecting said conical projection and a second position not intersecting said conical projection.

15. An apparatus as claimed in claim 12, wherein said means for ensuring comprises at least one relief (11c) provided in at least one other portion of said wire receiving guide means which normally resides above said wire guide means.

16. An EDM apparatus for transferring a wire electrode confined by a jet fluid stream from a wire electrode supplying wire guide body to a wire electrode receiving wire guide body, including means for varying a clearance between said wire electrode receiving wire guide body and a workpiece.

17. An EDM apparatus for transferring a wire electrode confined by a jet fluid stream from a wire electrode supplying wire guide body to a wire electrode receiving body, including means for changing the relative positions of said wire electrode receiving body and a wire guide residing generally within said wire electrode receiving body.

* * * * *